(12) United States Patent
Hong

(10) Patent No.: US 6,944,103 B2
(45) Date of Patent: Sep. 13, 2005

(54) OPTICAL PICK-UP ACTUATOR

(75) Inventor: Sam Nyol Hong, Suwon (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 09/820,035

(22) Filed: Mar. 28, 2001

(65) Prior Publication Data

US 2004/0052180 A1 Mar. 18, 2004

(30) Foreign Application Priority Data

Mar. 28, 2000 (KR) ........................................ 2000-15839

(51) Int. Cl.⁷ .............................................. G11B 7/00
(52) U.S. Cl. .................................. 369/44.32; 369/44.14
(58) Field of Search ........................... 369/44.32, 44.15, 369/44.14, 44.18

(56) References Cited

U.S. PATENT DOCUMENTS 5,768,034 A * 6/1998 Marino ....................... 359/814

* cited by examiner

*Primary Examiner*—Nabil Hindi
(74) *Attorney, Agent, or Firm*—Hong, Degerman, Kang & Schmadeka

(57) ABSTRACT

Disclosed is an optical pick-up actuator including a tilt-compensating magnetic circuit adapted to conduct a tilt compensation depending on current flowing a focusing coil attached to a lens holder maintained in a suspended state. The tilt-compensating magnetic circuit includes magnets or electromagnets for generating a tilt-compensating magnetic field. Alternatively, the tilt-compensating magnetic circuit is configured to allow focusing and tracking magnets and a tracking coil to be movable toward the outer periphery of a disk, to which the optical pick-up actuator is applied. In either configuration, the tilt-compensating magnetic circuit generates a tilt-compensating magnetic field depending on the current flowing through the focusing coil. In accordance with the optical pick-up actuator of the present invention can conduct a tilt compensation depending on a control current flowing the focusing coil at the point of time when a focusing control is required. The optical pick-up actuator also automatically traces a tilt component resulting from a run-out phenomenon occurring due to a deflection of the disk. Thus, the optical pick-up actuator has a stable control performance.

7 Claims, 5 Drawing Sheets

Tracking direction (a) Neutral State (b) Focusing Up (c) Focusing Down

OPTICAL PICK-UP ACTUATOR

BACKGROUND OF THE INVENTION

1. Field of the Invention

The present invention relates to an optical pick-up actuator which can automatically compensate a tilt resulting from a deflection or mechanical run-out of a disk.

2. Description of the Related Art

In pace with the development of disk media capable of optically recording information and reproducing the recorded information, diverse products have been developed in association with optical pick-up devices adapted to read information recorded on disks or to record information on disks.

In an optical recording/reproducing system for optically recording and reproducing information, an object lens driving unit configured to allow an optical spot to follow the surface vibrations and eccentricity of a disk is used, along with the optical system of a pick-up device, in order to achieve desired focusing and tracking operations.

This object lens driving unit is called an "optical pick-up actuator". The current tendency of designs and developments associated with such an optical pick-up actuator is toward those suitable for high-density disks.

Generally, an optical pick-up actuator serves to move a bobbin including an object lens to maintain a desired relative positional relation between the object lens and a disk. The optical pick-up actuator also serves to trace tracks of the disk in order to read information recorded on the disk or to record information on the disk. Such an optical pick-up actuator is driven in accordance with a moving coil system utilizing a magnetic field created by permanent magnets, thereby moving the object lens to a desired position. The moving part of the optical pick-up actuator is designed to be supported by supporting members (suspension wires) having a desired rigidity and attenuation characteristics so that it has desired frequency characteristics. The moving part conducts translational motions in focusing and tracking directions perpendicular to each other. In order to reduce errors involved in optical signals, the moving part should be driven without generating unnecessary vibrations such as rotation or torsion.

Such an optical pick-up actuator includes a lens holder adapted to hold an object lens. The lens holder should be configured to move upward, downward, left and right directions, for desired focusing and tracking operations of the object lens. This driving unit also includes a coil arranged in a magnetic space defined by magnets and a magnetic body, so that it utilizes a Lorentz force according to the Fleming's left-hand law.

FIGS. 1A and 1B are schematic views respectively illustrating the configuration of a conventional optical pick-up actuator.

Referring to FIGS. 1A and 1B, the conventional optical pick-up actuator includes a lens holder 102 adapted to hold an object lens 101, magnets 103, yokes 104, a tracking coil 105, a focusing coil 106, a plurality of wire springs 107, fixed printed circuit boards (PCBs) 108, and a frame 109.

In the optical pick-up actuator illustrated in FIGS. 1A and 1B, the lens holder 102 mounted with the object lens 101 is movable in accordance with the function of the wire springs 107. The object lens 101 is centrally attached to the lens holder 102. The focusing coil 106 is wound around the lens holder 102. The tracking coil 105, which has a rectangular wound coil shape, is attached to the upper surface of the focusing coil 106. The fixed PCBs 108 are fixedly mounted to opposite side surfaces of the lens holder 102, respectively. The yokes 104 are symmetrically arranged at opposite sides of the object lens 101, respectively. The magnets 103 are arranged to apply magnetic flux to the tracking coil 105 and focusing coil 106, thereby causing the tracking coil 105 and focusing coil 106 to generate electromagnetic forces, respectively.

The yokes 104 are installed to be integral with a pick-up base, using an integral attachment means.

The frame 109 is arranged at one edge of the optical pick-up actuator. A main PCB not shown is fixedly mounted to the frame 109 by means of set screws. Each of the wire springs 107 is coupled to the frame 109 at one end thereof. Typically, four wire springs 107 are coupled to the frame 109. The other end of each wire spring 107, which is coupled to the frame 109 at one end thereof, is connected to an associated one of the fixed PCBs 108 attached to the lens holder 102. In accordance with such an arrangement, the lens holder 102 is maintained in a suspended state by the wire springs 107.

Now, the operation of the conventional optical pick-up actuator having the above mentioned configuration will be described.

When current is applied to the focusing coil 106 under the influence of a magnetic field, an electromagnetic force is generated from the focusing coil 106. This electromagnetic force serves to drive the moving part of the optical pick-up actuator, that is, a lens holder assembly, in upward and downward directions, that is, focusing directions. When current is applied to the tracking coil 105 in the same fashion as mentioned above, the moving part of the optical pick-up actuator moves in left and right directions, that is, tracking directions.

In accordance with such focusing and tracking operations, a laser beam emitted from the object lens 101 can always be focused onto the reflection surface of the disk recorded with signals (pits) at a desired focusing depth (focusing operation) while tracing the tracks of the disk (tracking operation).

Recently, requirements of recording and reproduction of large-quantity data have been increased. In pace with such requirements, data recording and reproducing media, that is, optical disks, have been developed to have a higher density. In order to record information on such a high-density disk or to read the recorded information, the size of the laser beam focused onto the disk should be correspondingly reduced. To this end, it is necessary to use a laser with a reduced wavelength $\lambda$ and an object lens with a reduced numerical aperture NA. Here, the diameter of a focused laser beam, D, can be expressed by "$D=0.82\times\lambda/NA$".

Meanwhile, the tilt margin of a drive control system for optical disks depends on the characteristics of elements included in an optical system used. Typically, the tilt margin should meet the condition "tilt margin $\propto \lambda/NA^3$".

Thus, tilt compensation is strongly required in drive systems used for data recording and reproduction in association with high-density disks. In particular, tilt components resulting from a deflection or mechanical run-out of a disk may adversely affect the control system. In drive systems used for data recording and reproduction in association with high-density disks, accordingly, it is necessary to use an optical pick-up actuator capable of tracing the tilt component of the disk in order to realize a stable servo.

SUMMARY OF THE INVENTION

Therefore, an object of the invention is to provide an optical pick-up actuator which can automatically trace a tilting angle resulting from a deflection or mechanical run-out of a disk, thereby compensating for the tilting angle.

In accordance with the present invention, this object is accomplished by providing an optical pick-up actuator comprising: a lens holder mounted with an object lens and attached with tracking and focusing coils, the lens holder being maintained in a suspended state; magnets adapted to generate a magnetic field interlinked with magnetic fields respectively generated by flows of current through the tracking and focusing coils, thereby allowing the object lens to be driven in focusing and tracking directions in a suspended state; and a tilt-compensating magnetic circuit adapted to generate a magnetic field interlinked with the magnetic field generated by the current flowing through the focusing coil, thereby conducting a tilt compensation depending on the current flowing through the focusing coil.

The tilt-compensating magnetic circuit may comprise tilt-compensating magnets.

The tilt-compensating magnetic circuit may be configured to shift the center of a focusing force toward an outer periphery of a disk, to which the optical pick-up actuator is applied, so that simultaneous focusing and tilting operations are conducted.

The focusing and tracking magnets and the tracking coil may be configured to be movable toward the outer periphery of the disk for the shift of the focusing force center toward the outer periphery of the disk.

The tilt-compensating magnetic circuit may comprise tilt-compensating electromagnets.

The tilt-compensating magnetic circuit conducts a focusing-up operation for generating a tilt with a minus (−) tilting angle and a focusing-down operation for generating a tilt with a tilt with a plus (+) tilting angle, thereby tracing a tilt component resulting from a deflection of a disk, to which the optical pick-up actuator is applied, for a compensation for the tilt component.

The tilt compensation of the tilt-compensating magnetic circuit is conducted in proportional to the current flowing through the focusing coil.

The tilt compensation of the tilt-compensating magnetic circuit is conducted in a radial direction, depending on the current flowing through the focusing coil.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1A:
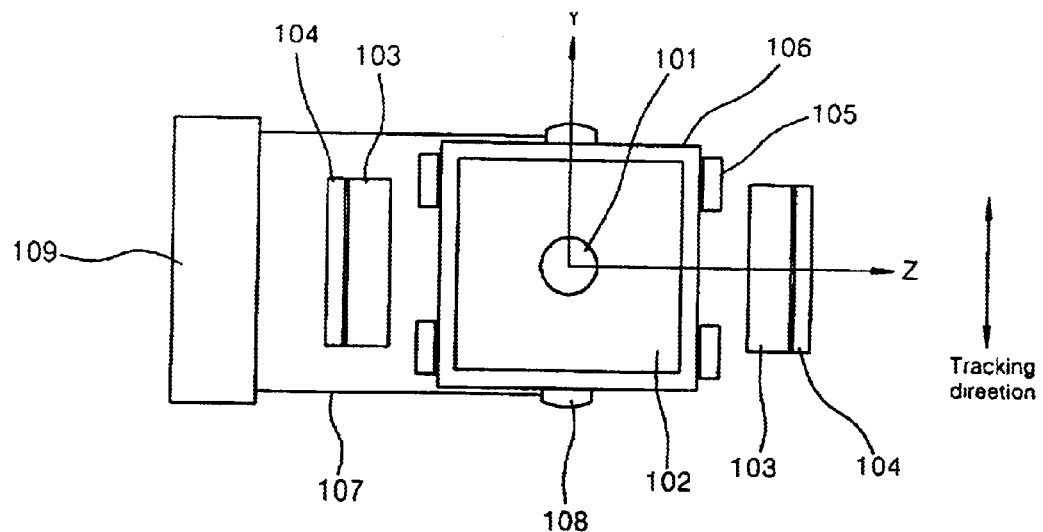
FIGS. 1A and 1B are schematic views respectively illustrating the configuration of a conventional optical pick-up actuator.
Figure 1B:
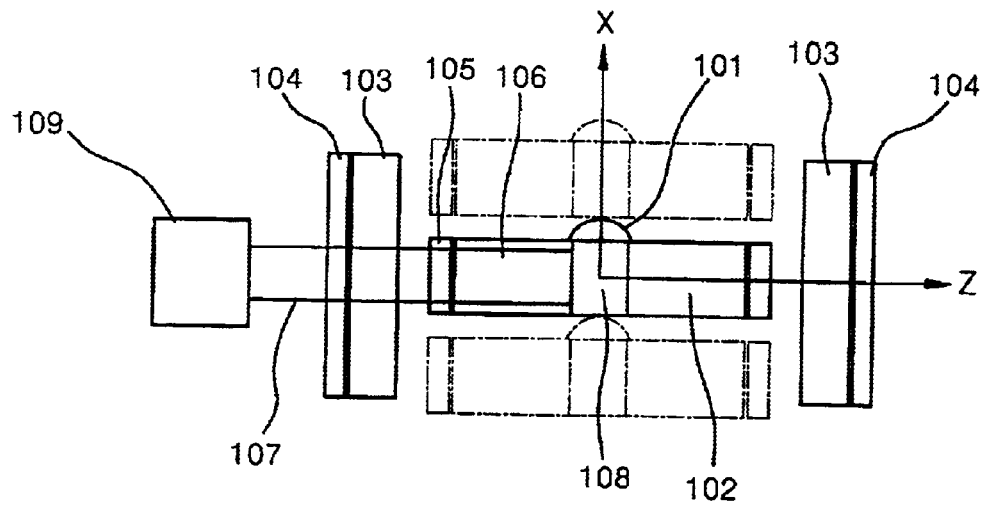
Figure 2:
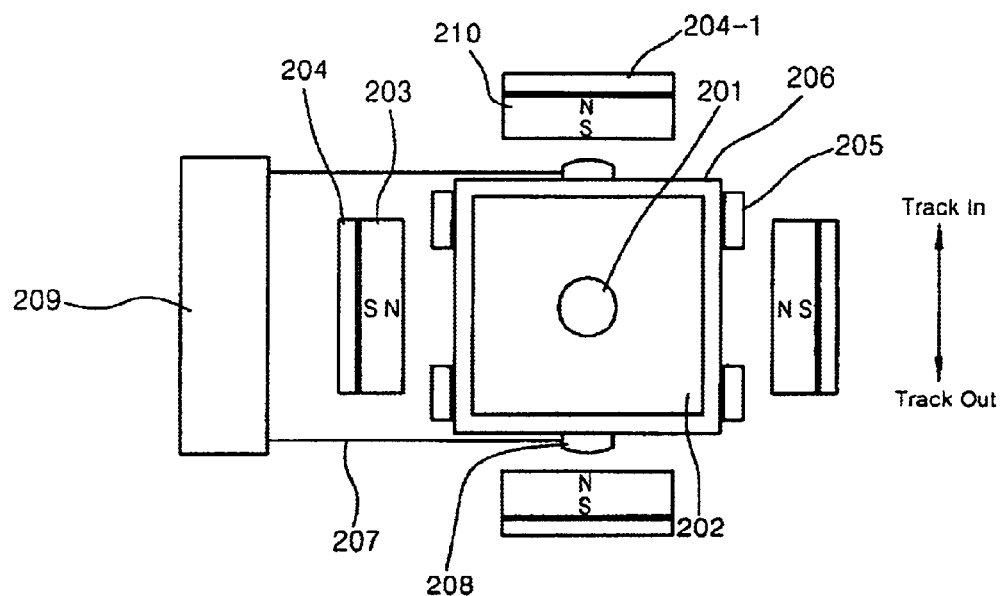
FIG. 2 is a schematic view illustrating the configuration of an optical pick-up actuator according to a first embodiment of the present invention.

FIG. 2 is a schematic view illustrating the configuration of an optical pick-up actuator according to a first embodiment of the present invention. As shown in FIG. 2, the optical pickup actuator according to the first embodiment of the present invention includes a lens holder 202 adapted to hold an object lens 201, focusing and tracking magnets 203, a pair of yokes 204, a tracking coil 205, a focusing coil 206, a plurality of wire springs 207, fixed PCBs 208, a frame 209, and tilt compensating magnets 210.

In detail, the lens holder 202 mounted with the object lens 201 is movable in accordance with the function of the wire springs 207. The object lens 201 is centrally attached to the lens holder 202. The focusing coil 206 is wound around the lens holder 202. The tracking coil 205, which has a rectangular wound coil shape, is attached to the upper surface of the focusing coil 206. The fixed PCBs 208 are fixedly mounted to opposite side surfaces of the lens holder 202, respectively. The yokes 204 are symmetrically arranged at opposite sides of the object lens 201, respectively. The magnets 203 are arranged to apply magnetic flux to the tracking coil 205 and focusing coil 206, thereby causing the tracking coil 205 and focusing coil 206 to generate electromagnetic forces, respectively.

For a tilt compensation, additional yokes 204-1 are arranged in a tracking direction. The tilt compensating magnets 210 are attached to the yokes 204-1, respectively. Thus, a magnetic circuit is formed which serves to generate a tilting movement in a radial direction of the disk.

Now, the operation of the optical pick-up actuator having the above mentioned configuration will be described.

When current is applied to the focusing coil 106, the optical pick-up actuator conducts a focusing operation. At this time, the optical pick-up actuator also conducts a tilting operation proportional to the amount of the current flowing through the focusing coil 206, in accordance with the magnetic field structure formed in the tracking direction. That is, the optical pick-up actuator conducts the focusing operation while simultaneously conducting the tilting operation in proportional to the focusing distance made in accordance with the focusing operation conducted by the function of the focusing coil 206, by virtue of the magnetic field created when current flows through the focusing coil 206 and the magnetic field created by the tilt compensating magnetic circuit (magnets 210).

Figure 3:
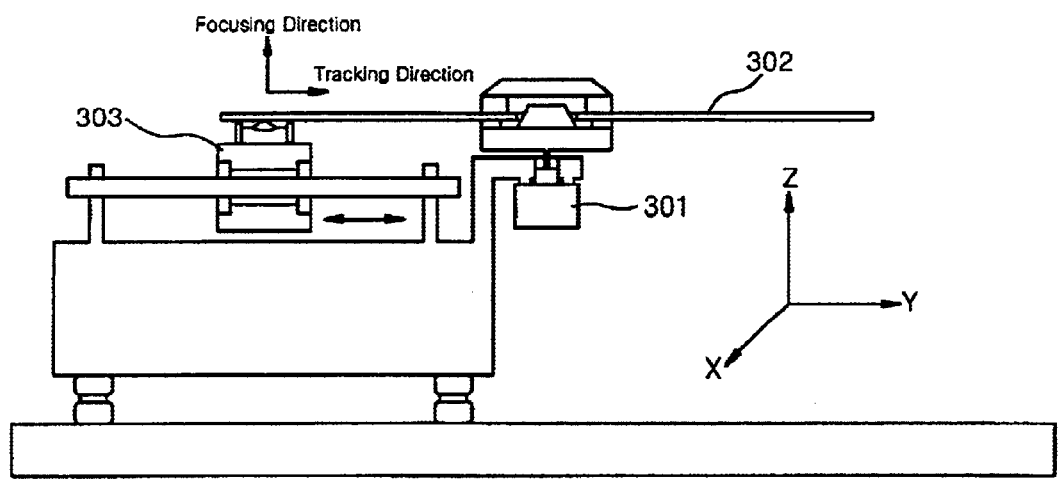

FIG. 3 illustrates the configuration of a general optical recording and reproducing apparatus. Referring to FIG. 3, an optical pick-up device 303 conducts an optical recording or reproducing operation while reciprocating along a disk 302 between the inner and outer peripheries of the disk 302 during a rotation of the disk 302 conducted by a spindle motor 301. A run-out phenomenon may occur during the rotation of the disk 302. This will be described in conjunction with FIGS. 4a to 4c.

Figure 4:
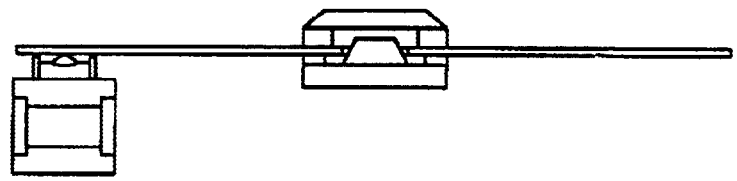
FIGS. 4a to 4c are schematic views illustrating a run-out phenomenon of a disk and a focusing operation associated with the disk.
Figure 4:
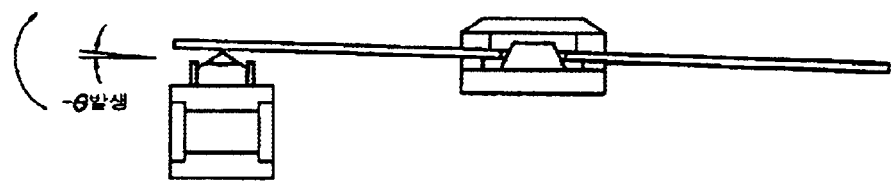
Figure 4:
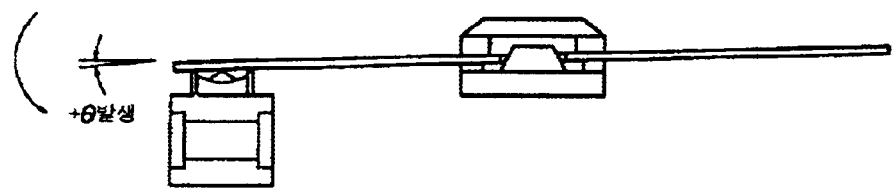

FIGS. 4a to 4c illustrate a run-out phenomenon of a disk and a focusing operation associated with the disk. FIG. 4a illustrates a focusing operation in a neutral state, FIG. 4b illustrates a focusing-up operation, and FIG. 4c illustrates a focusing-down operation.

In accordance with the function of the magnetic circuit formed by the tilt compensating magnets, a minus (−) tilting angle in an X axis is formed in the focusing-up operation of FIG. 4b. On the other hand, a plus (+) tilting angle is formed in the focusing-down operation of FIG. 4c. Thus, the tilt component resulting from a deflection of the disk can be surely traced.

Figure 5:
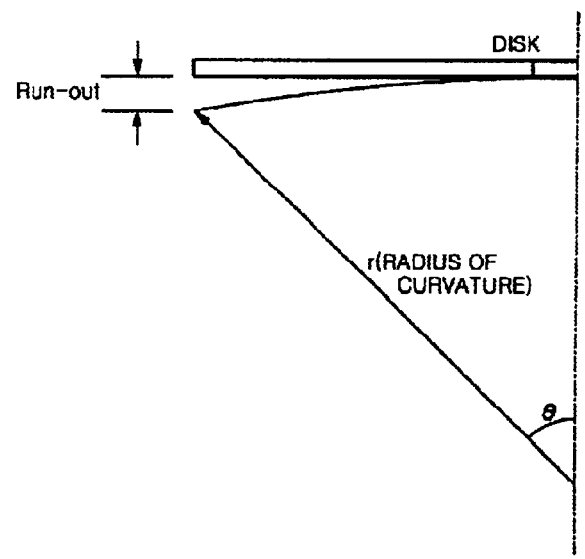
FIG. 5 is a schematic view illustrating the relation between a tilting angle and a focusing distance.

Also, the focusing distance required against a run-out phenomenon occurring at the disk may be defined by "r(1−cos θ)", as shown in FIG. 5. Here, "θ" and "r" represent a tilting angle and a radius of curvature associated with the run-out phenomenon.

Figure 6:
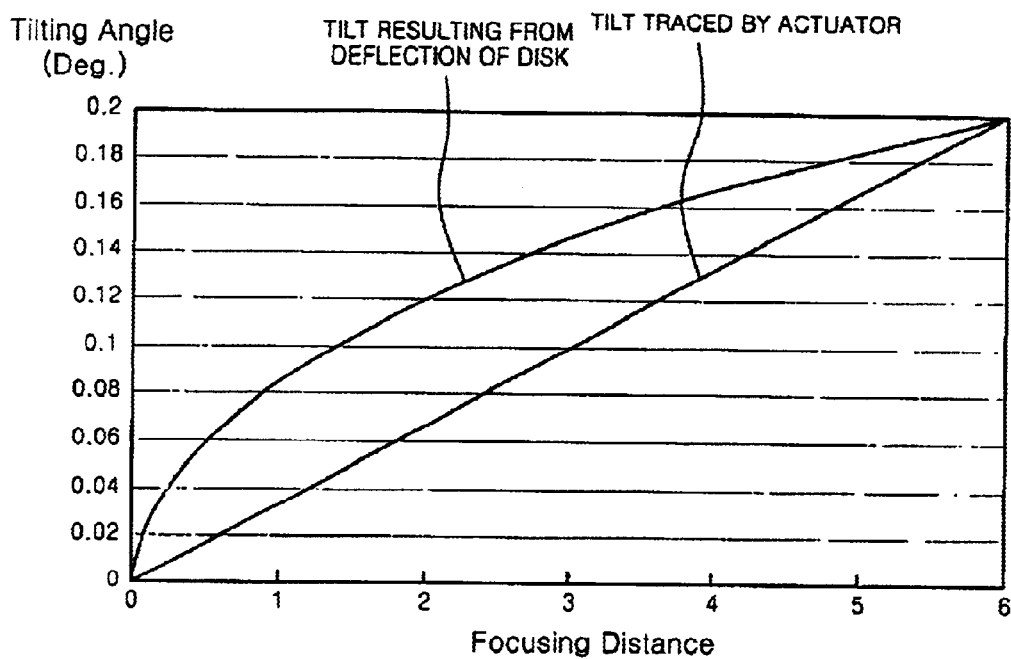
FIG. 6 is a graph depicting a tracing operation for the tilting angle of the disk conducted by the optical pick-up actuator according to the present invention.

FIG. 6 is a graph depicting a tracing operation for the tilting angle of the disk conducted by the optical pick-up actuator according to the present invention. Referring to FIG. 6, it can be found that when a tilt is generated due to a deflection of the disk, the optical pick-up actuator reduces errors resulting from the tilt by tracing the tilt.

Figure 7:
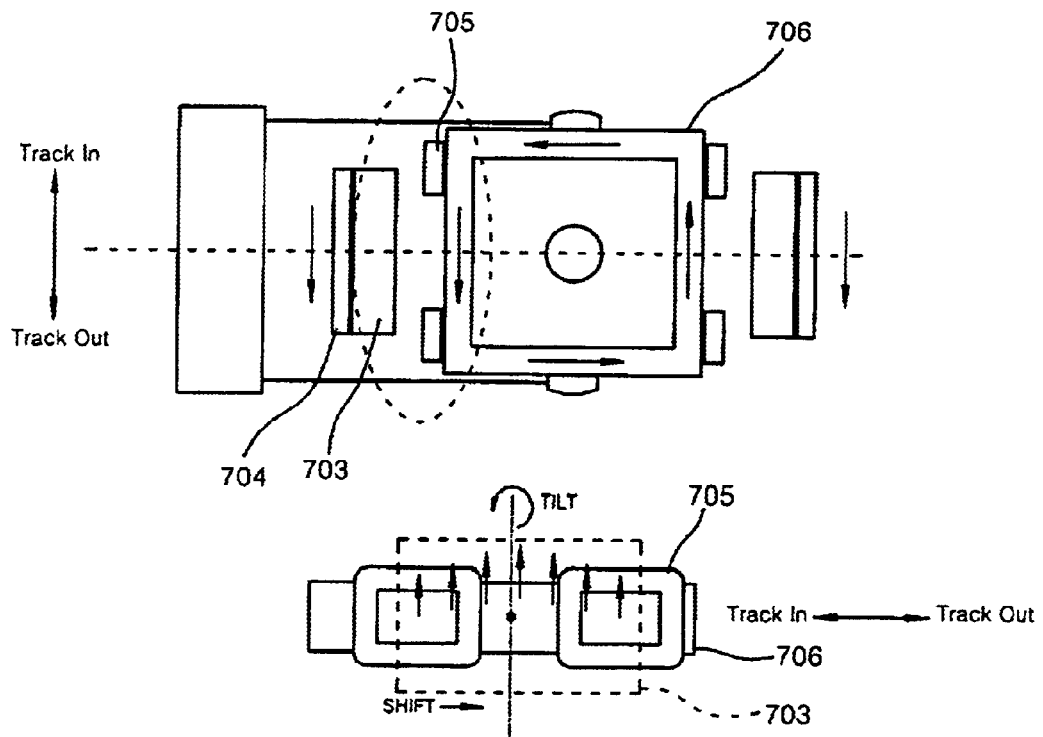
FIG. 7 is a schematic view illustrating the configuration of an optical pick-up actuator according to a second embodiment of the present invention.

FIG. 7 illustrates the configuration of an optical pick-up actuator according to a second embodiment of the present invention. In the case of the optical pick-up actuator according to the second embodiment, its magnets 703, yokes 704, and tracking coil 705 are configured to be movable to allow the center of a focusing force to be shifted in a tracking-out direction. That is, the magnets 703, yokes 704, and tracking coil 705 are installed in such a fashion that they are movable toward the outer periphery of the disk, that is, in a tracking-out direction, thereby shifting only the center of the focusing force toward the outer periphery of the disk. Thus, focusing and tilting operations can be simultaneously carried out. In FIG. 7, the reference numeral 706 denotes a focusing coil.

Figure 8:
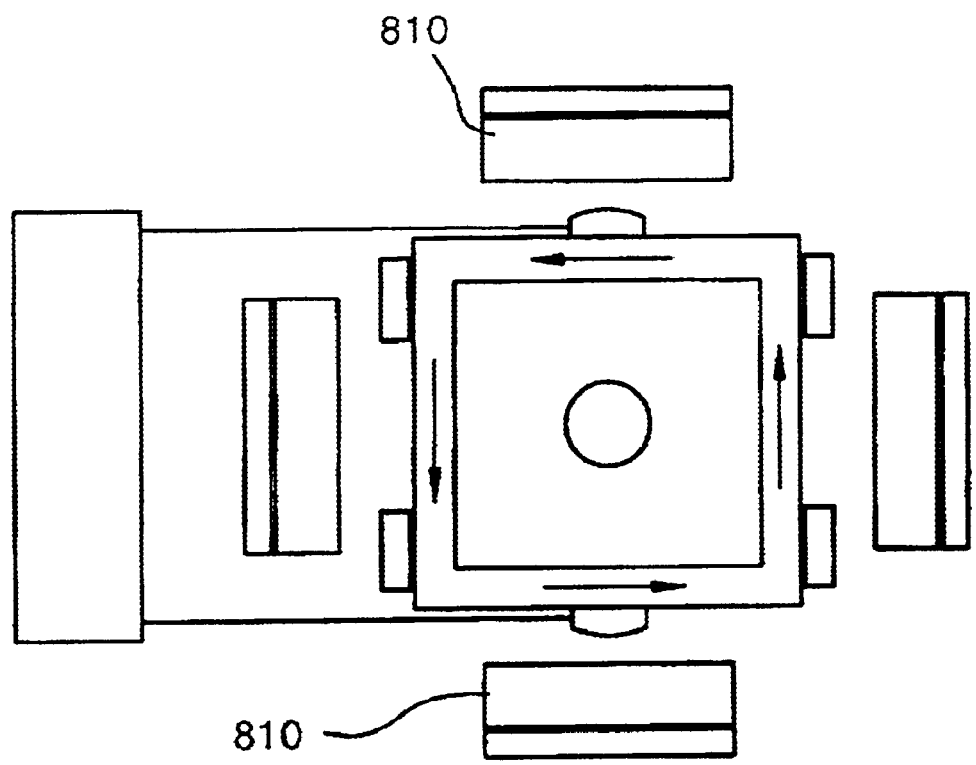
FIG. 8 is a schematic view illustrating the configuration of an optical pick-up actuator according to a third embodiment of the present invention.

FIG. 8 illustrates the configuration of an optical pick-up actuator according to a third embodiment of the present invention. The optical pick-up actuator of FIG. 8 according to the third embodiment is similar to that of the first embodiment, except that the tilt-compensating magnets 210 used in the first embodiment are substituted by electromagnets 810. Where an electromagnetic circuit for a tilting operation is formed using the electromagnets 810, it is possible to achieve a tilting control capable of positively coping with condition variations occurring in the disk, optical system or other mechanisms.

As apparent from the above description, the present invention provides an optical pick-up actuator which can automatically trace a tilting component resulting from a run-out phenomenon occurring due to a deflection of a disk, thereby compensating for the tilt. Thus, the present invention can realize an optical pick-up actuator having a stable control performance.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pick-up actuator comprising:
   a lens holder mounted with an object lens and attached with tracking and focusing coils, the lens holder being maintained in a suspended state;
   magnets adapted to generate a magnetic field interlinked with magnetic fields generated respectively by flows of current through the tracking and focusing coils, thereby allowing the object lens to be driven in focusing and tracking directions; and
   a tilt-compensating magnetic circuit which is located in a tracking direction interposing the lens holder therebetween and is adapted to generate a magnetic field interlinked with the magnetic field generated by the current flowing through the focusing coil, thereby automatically compensating a tilt depending on the current flowing through the focusing coil;
   wherein the tilt-compensating magnetic circuit is conducted to make a minus (−) tilting angle in its focusing-up operation and a plus (+) tilting angle in its focusing-down operation.

2. The optical pick-up actuator according to claim 1, wherein the tilt-compensating magnetic circuit comprises tilt-compensating magnets.

3. The optical pick-up actuator according to claim 1, wherein the tilt-compensating magnetic circuit is configured to shift the center point of a focusing force toward an outer periphery of a disk, thereby conducting the focusing and tilting operations simultaneously.

4. The optical pick-up actuator according to claim 3, wherein the focusing and tracking magnets and the tracking coil are configured to be movable toward the outer periphery of the disk, thereby shifting the center point of the focusing force toward the outer periphery of the disk.

5. The optical pick-up actuator according to claim 1, wherein the tilt-compensating magnetic circuit comprises tilt-compensating electromagnets.

6. The optical pick-up actuator according to claim 1, wherein the tilt-compensating magnetic circuit compensates the amount of tilt which is proportional to the current flowing through the focusing coil.

7. The optical pick-up actuator according to claim 1, wherein the tilt compensated by the tilt-compensating magnetic circuit is a radial tilt.

* * * * *